United States Patent
MacManus

[15] 3,645,758
[45] Feb. 29, 1972

[54] PACKAGE FOR A LAYER CAKE

[72] Inventor: John MacManus, 143-16 Twenty-second Road, Whitestone, N.Y. 11357

[22] Filed: Mar. 4, 1970

[21] Appl. No.: 16,293

[30] Foreign Application Priority Data

Mar. 7, 1969 Great Britain......................12,264/69

[52] U.S. Cl. .........................99/172, 99/171 C, 206/45.32, 206/45.34, 206/46 F, 220/60 R, 220/65
[51] Int. Cl. .....................................B65d 43/10, B65d 85/36
[58] Field of Search..............206/45.34, 45.32, 46 F, DIG. 6; 220/65, 60 R; 99/171 R, 181 R, 172; 217/3 FC; 229/2.5, 14 C, 14 R, 46

[56] References Cited

UNITED STATES PATENTS

| 3,101,864 | 8/1963 | Glickman | 220/65 |
| 2,627,824 | 2/1953 | Schulze | 220/65 |
| 1,851,981 | 4/1932 | Morris | 206/45.34 |
| 2,974,842 | 3/1961 | Reifers | 229/2.5 |
| 2,340,124 | 1/1944 | Hoyt | 229/46 |
| 2,089,728 | 8/1937 | Brogden | 206/DIG. 6 |
| 1,464,671 | 8/1923 | Ward | 217/3 FC |
| 1,713,469 | 5/1929 | Fritzsche | 229/14 R |
| 2,170,060 | 8/1939 | Meyer | 206/45.34 |

*Primary Examiner*—William T. Dixson, Jr.
*Attorney*—McCanna, Morsbach, Pillote & Muir

[57] ABSTRACT

A cylindrical transparent outer container has an open top. A removable baseboard is inserted through the open top of the container and rests on inturned flanges at the bottom of the sidewall of the container. A discontinuous transparent liner fits with its free ends abutting one another nesting inside and against the inner wall of the container and resting on the baseboard. A layer cake fits snugly within the liner so that the one or more layers of filling are sealed between the layers of baked cake by the engagement of the edges of the layers of baked cake against the liner.

8 Claims, 4 Drawing Figures

PATENTED FEB 29 1972
3,645,758
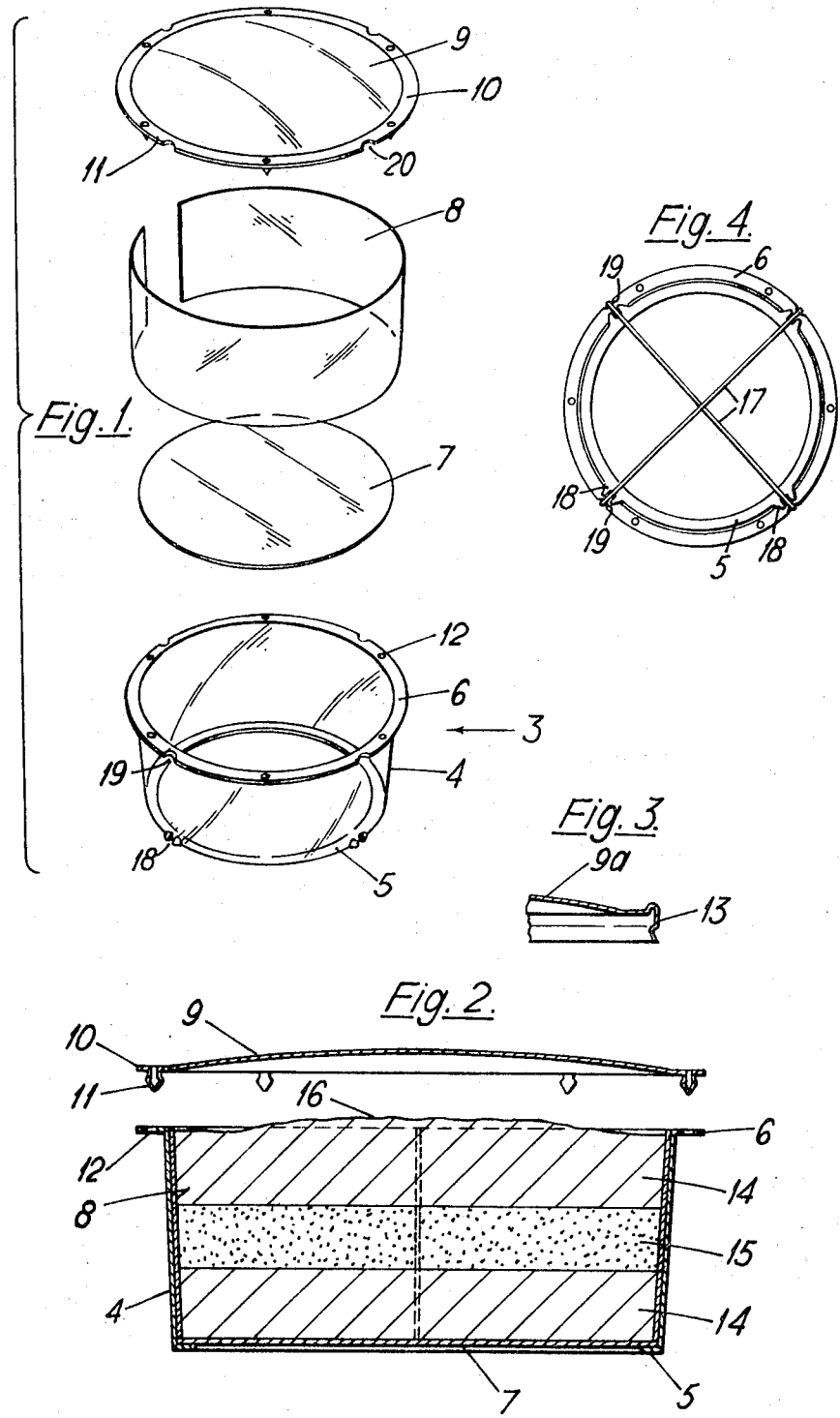

PACKAGE FOR A LAYER CAKE

BACKGROUND

The invention pertains to packages or receptacles for holding and displaying a layer cake.

A layer cake has a number of layers of baked cake one on top of the other with interposed layers of filling such as fruit, jam, icing, or cream. There is a problem which such cakes that during handling, display, and transport from the store to the home, the filling tends to ooze out from between the layers and to run down the side of the cake. This results in an extremely messy and unsalable product.

One previous attempt to solve this problem is shown in my U.S. Pat. No. 2,220,971, issued Nov. 12, 1940; and my U.S. Pat. No. 2,283,380, issued May 19, 1942. Those patents show packaging the cake in a surrounding cylindrical transparent sleeve. The baked cake layers fit reasonably tight against the inside of the sleeve so that the filling was sealed between the layers and yet visible through the transparent sleeve. However this solution had its own disadvantages. If the sleeve was a discontinuous band, the free edges of the band required buckles or other means to attach or reattach them. If the sleeve was a continuous cylinder, the cake could only be removed by lifting the cylinder off the cake or by pushing the cake up through the cylinder. The relative sliding between the cylinder and cake caused axial smearing of the filling over the edges of the baked cake discs, again resulting in an unsightly appearance. The problem was even more marked when a partly eaten cake was reinserted into the cylinder again because the cutting of the cake tends to squeeze the cake layers together and squeeze the filling from between their edges so that there was even more filling available at the edges to be smeared.

SUMMARY

The present invention relates to an improved package for a layer cake.

In accordance with the present invention, the package comprises a substantially transparent container having an open top and an inwardly projecting flange at the bottom, a removable baseboard dimensioned for insertion through the open top of the container and for resting on the flange, and a discontinuous transparent liner band having free ends and dimensioned to fit with the free ends abutting when the band is contiguous to the inside of the container.

It is a general object of the present invention to provide a package for a layer cake which alleviates the aforementioned problems.

Another object is to provide a package for a layer cake in which the cake can easily be viewed and which permits the cake to be quickly removed from the package and retained thereto.

Still another object is to provide a package for a layer cake which has a cover which can be readily removed and replaced.

Other objects are to provide a package for a layer cake which is nestable, which has a structurally strong cover, and which has cords for securing the package.

These, and other objects and advantages of the present invention, will become apparent as the same becomes better understood from the following detailed description when taken in conjunction with the drawing.

DRAWING

FIG. 1 is an exploded perspective view of one embodiment of the invention;

FIG. 2 is a central vertical section thereof;

FIG. 3 is a fragmentary sectional view of an alternative cover; and

FIG. 4 is a bottom view of the package.

DESCRIPTION

Reference is now made more particularly to the drawings which illustrate the best presently known mode of carrying out the invention and wherein similar reference characters indicate the same parts throughout the several views.

The outer container 3 has a generally cylindrical but slightly flared sidewall 4 with an inwardly extending flange 5 at its bottom and an outwardly extending flange 6 at its top. A baseboard 7 is dimensioned for insertion through the open top of the container and will rest on the flange 5. A discontinuous liner or band 8 can then be positioned in the container 3 and will nest against its sidewall and rest on top of the baseboard 7. An upwardly convex thin walled cover 9 has a peripheral flange 10 which may be formed with integral bulbous projections 11 which snap through complementary apertures 12 in the flange 6 to hold the lid on the container. Six projections 11 and holes 12 are shown in the illustrated example but the number may need to be changed to a greater or lesser number depending on the product involved.

FIG. 3 shows a modified lid 9a the edge of which is formed with a skirt 13 shaped to provide snap fitting engagement with the edge of the flange 6.

The cake shown in the lined container in FIG. 2 has two baked cake layers 14 with an interposed layer of filling 15 and decorated with topping 16, although the respective number of layers and filling can obviously be different.

With this arrangement the side of the cake is visible through the transparent liner 8 and transparent container wall 4 and the whole makes a very pleasing and natural display without the need for artistic lithography. The cake can readily be removed from the outer container 3 for cutting, by pressing the baseboard 7 upwards relatively to the outer container 3 so that it carries the cake surrounded by the liner 8 upwards out of the open top of the container. During this operation no smearing takes place and the liner can then be unwrapped from the cake. Analogous reverse procedure enables a partly cut cake to be repacked in the container again without any smearing. The edges of the liner 8 are held in abutting relationship and prevented from spreading apart by the wall 4 of the outer container 3 and no other means is required to hold the ends of the liner together.

Preferably the cake is made from its components of baked cake layers 14 and filling 15 simultaneously with its packaging in the liner 8 and container 3. Thus the container 3 is first provided with its baseboard 7 and liner 8. The bottom layer 14 is then pressed into the bottom of the container and the first filling layer 15 is deposited on the top of layer 14. The next cake layer 14 is then inserted and pressed down so that the filling is squeezed out into engagement with the liner 8, and so on if there is to be more than one layer of filling.

The baseboard 7 may be a disc of silicone coated cardboard and the container 3 and liner 8 of any suitable transparent plastics material. The container is preferably a vacuum molding with sidewalls 4 and an integral base, the majority of the base subsequently being cut away to leave the inturned flange 5 on which the baseboard will rest. The height of the sidewall 4 may be between 1½ and 4 inches, for example 2 inches. The sidewall preferably flares outwardly very slightly in the upward direction so that the containers can be nested in one another prior to use. A flare corresponding to a total difference of diameter of one-sixteenth inch between the top and the bottom of a container having a diameter of in the range of between 4 and 9 inches, is suitable.

The baked cake layers 14 will normally be baked in pans having nominal size but the resulting cake layer will usually have a diameter less than the nominal diameter of the pan owing to inevitable shrinkage caused by baking and cooling. In order that the outer container 3 of the package may have the flare referred to above, and in order to ensure that the edges of the baked cake layers will seal against the liner 8, the outer container and liner are carefully dimensioned. The outer container and liner preferably have wall thickness and overall diameter measurements such that the internal diameter of the container and liner at the bottom will be at least one-eighth of an inch less than the nominal diameter of the pan in which the baked cake layers were baked and have a slightly greater diameter at the top, but still less than the nominal diameter of the pan.

It is preferable to provide the outer container 3 with the cover 9 to protect the cake, i.e., both during transport and handling and for hygienic reasons. A suitable cover may be a plastics molding, preferably again transparent, having the peripheral flange 10 with integral fixing means for fixing it to the outwardly extending flange 6 at the top of the outer container wall. The fixing means may for example be the bulbous studs 11 which snap through complementary apertures 12 in the container flange, and/or a depending skirt 13 with an internal groove which receives the outer edge of the container flange as a snap fit.

A layer cake is frequently provided with decorative topping, and this may be applied to the cake at the point of sale. This topping 16 may well project above the upper rim of the outer container and in order to accommodate this topping, the cover 9 is preferably internally concave, that is upwardly bowed in the usual event in which it is thin walled. This adds structural rigidity and is useful if the containers are stacked. The cake packaged within its covered container is suitable for freezing.

When the outer container is provided at its upper edge with an outwardly extending annular flange and when it is fitted with or without a lid, it is suitable for final packaging in a slide carton.

FIG. 4 illustrates an alternative arrangement in which two endless elastic cords 17 are located in notches 18, 19 and 20 formed integrally with the bottom of the container 3, in the flange 6, and in the cover flange 10, respectively. At least two angularly spaced sets of diametrically opposed notches may be provided. Each set of notches locates the endless, and preferably slightly elastic, cord 17 so that the cords cross over one another on the top and below the bottom of the package. The fingers can then be inserted beneath the cords crossing over one another on the top of the package for carrying. Most simply there are two sets of notches angularly spaced by 90° and two cords which cross over mutually perpendicular.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. A package for a layer cake, having at least one layer of filling, the package including: a substantially transparent container having a peripheral wall surrounding the layer cake and defining an open top, the peripheral wall having a slight outwardly flare in the upward direction so that the containers can be nested prior to use, the peripheral wall having a relatively narrow inwardly projecting flange at its bottom, a removable baseboard supporting the layer cake and dimensioned for insertion through the open top of the container and for resting on said flange, a discontinuous transparent liner band surrounding the layer cake and contiguous thereto, and the liner having free ends and dimensioned to fit with the free ends abutting when contiguous to the inside of the container.

2. A package according to claim 1 wherein the container has an outwardly extending peripheral flange at the top of the peripheral wall, and including: a cover overlying the open end of the container, and means for securing the cover to the peripheral flange.

3. A package according to claim 2, in which the cover is formed of transparent plastic and is internally concave, the cover having a peripheral portion for lying closely adjacent the peripheral flange at the top of the container wall.

4. A package according to claim 3, in which the cover peripheral portion and the peripheral flange at the top of the wall are planar, and the means for securing the cover includes first interfitting means on the cover peripheral portion, and second interfitting means on the container flange for cooperating to secure the cover.

5. A package according to claim 4, in which one of the interfitting means includes a plurality of bulbous projections, and the interfitting means includes a plurality of openings through which the bulbous projections may be snapped to secure the cover.

6. A package according to claim 4, in which the second interfitting means comprises the outer edge of the container flange, and the first interfitting means includes a peripheral skirt portion depending from the planar peripheral portion of the cover and having a groove therein arranged to provide a snap fitting engagement with said outer edge of the container flange.

7. A package according to claim 2, in which the container has at least two angularly spaced sets of diametrically opposed notches at the top and bottom thereof, and the means for securing the cover includes cord means located in each set of notches.

8. A package according to claim 7 in which there are only two sets of notches angularly spaced by 90° and the cord means comprises two elastic endless cords which cross over nutually perpendicular.

* * * * *